(12) United States Patent
Silver et al.

(10) Patent No.: US 11,594,044 B2
(45) Date of Patent: *Feb. 28, 2023

(54) AUTONOMOUS VEHICLE SYSTEM CONFIGURED TO RESPOND TO TEMPORARY SPEED LIMIT SIGNS

(71) Applicant: Waymo LLC, Mountain View, CA (US)

(72) Inventors: David Harrison Silver, San Carlos, CA (US); Pankaj Chaudhari, Mountain View, CA (US); Carl Kershaw, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 16/897,359

(22) Filed: Jun. 10, 2020

(65) Prior Publication Data
US 2020/0364473 A1  Nov. 19, 2020

Related U.S. Application Data

(63) Continuation of application No. 15/857,952, filed on Dec. 29, 2017, now Pat. No. 10,713,510.

(51) Int. Cl.
*G06F 17/00* (2019.01)
*G06V 20/58* (2022.01)
(Continued)

(52) U.S. Cl.
CPC ......... *G06V 20/582* (2022.01); *B60W 40/105* (2013.01); *G05D 1/0088* (2013.01);
(Continued)

(58) Field of Classification Search
CPC ............... G06V 20/582; B60W 40/105; B60W 2554/80; B60W 2555/60; B60W 2556/50;
(Continued)

(56) References Cited

U.S. PATENT DOCUMENTS

| 8,983,750 B2 | 3/2015 | Maruyama |
| 9,463,794 B1 | 10/2016 | Silver et al. |

(Continued)

FOREIGN PATENT DOCUMENTS

| JP | 2003030777 A | 1/2003 |
| JP | 2004326730 A | 11/2004 |

(Continued)

OTHER PUBLICATIONS

"International Search Report and Written Opinion received for Application No. PCT/US2018/062603 dated Mar. 21, 2019", 9 pages.

(Continued)

*Primary Examiner* — Ronnie M Mancho
(74) *Attorney, Agent, or Firm* — Botos Churchill IP Law

(57) ABSTRACT

Aspects of the disclosure provide for a method for identifying speed limit signs and controlling an autonomous vehicle in response to detected speed limit signs. The autonomous vehicle's computing devices identifies a speed limit sign in a vehicle's environment and a location and orientation corresponding to the speed limit sign. Then, the and orientation location of the speed limit sign is determined to not correspond to a pre-stored location and a pre-stored orientation of a speed limit sign that is pre-stored in map information. An effect zone of the speed limit sign is determined based on the location and orientation of the speed limit sign and characteristics of surrounding areas or other detected object before or after the speed limit sign. The autonomous vehicle's computing devices determines a response of the vehicle based on the determined effect zone, and controls the autonomous vehicle based on the determined response.

20 Claims, 8 Drawing Sheets

(51) Int. Cl.
*G05D 1/02* (2020.01)
*B60W 40/105* (2012.01)
*G05D 1/00* (2006.01)

(52) U.S. Cl.
CPC ....... *G05D 1/0223* (2013.01); *B60W 2554/80* (2020.02); *B60W 2555/60* (2020.02); *G05D 2201/0213* (2013.01)

(58) Field of Classification Search
CPC .......... B60W 2720/10; B60W 30/146; B60W 60/001; B60W 40/02; G05D 1/0088; G05D 1/0223; G05D 2201/0213; G05D 1/0227; G05D 1/0274
USPC .......................................................... 701/28
See application file for complete search history.

(56) References Cited

U.S. PATENT DOCUMENTS

| | | | |
|---|---|---|---|
| 9,558,411 B1 | 1/2017 | Ferguson et al. | |
| 9,645,577 B1 | 5/2017 | Frazzoli et al. | |
| 9,682,707 B1 | 6/2017 | Silver et al. | |
| 9,707,960 B2* | 7/2017 | Gutmann | B60W 30/09 |
| 9,720,411 B2 | 8/2017 | Crombez et al. | |
| 10,005,460 B2* | 6/2018 | Gutmann | G08G 1/096725 |
| 10,059,334 B1* | 8/2018 | Zhu | G08G 1/09623 |
| 10,293,822 B1 | 5/2019 | Silver | G06V 20/58 |
| 10,377,378 B2* | 8/2019 | Gutmann | B60W 30/09 |
| 10,493,994 B1* | 12/2019 | Fields | H04W 4/40 |
| 10,713,510 B2* | 7/2020 | Silver | G05D 1/0223 |
| 11,279,346 B2* | 3/2022 | Gutmann | B60W 30/09 |
| 2004/0215377 A1 | 10/2004 | Yun | |
| 2007/0192012 A1 | 8/2007 | Letang | |
| 2009/0005929 A1 | 1/2009 | Nakao | |
| 2010/0207787 A1 | 8/2010 | Catten et al. | |
| 2010/0302361 A1* | 12/2010 | Yoneyama | G06V 20/582 348/135 |
| 2013/0135118 A1 | 5/2013 | Ricci | |
| 2013/0245945 A1 | 9/2013 | Morita et al. | |
| 2014/0063232 A1 | 3/2014 | Fairfield et al. | |
| 2015/0109450 A1 | 4/2015 | Walker | |
| 2016/0035223 A1 | 2/2016 | Gutmann et al. | |
| 2016/0039426 A1 | 2/2016 | Ricci | |
| 2016/0117923 A1 | 4/2016 | Dannenbring | |
| 2016/0170414 A1 | 6/2016 | Chen et al. | |
| 2016/0231746 A1 | 8/2016 | Hazelton et al. | |
| 2016/0358477 A1 | 12/2016 | Ansari | |
| 2017/0008521 A1 | 1/2017 | Braunstein et al. | |
| 2017/0010614 A1 | 1/2017 | Shashua et al. | |
| 2017/0032670 A1 | 2/2017 | Poornachandran et al. | |
| 2017/0154554 A1 | 6/2017 | Tanaka et al. | |
| 2017/0183006 A1 | 6/2017 | Chack et al. | |
| 2017/0243483 A1 | 8/2017 | Kaneshige et al. | |
| 2017/0277716 A1 | 9/2017 | Giurgiu et al. | |
| 2018/0024562 A1 | 1/2018 | Bellaiche | |
| 2018/0186278 A1* | 7/2018 | Song | B60Q 1/076 |
| 2018/0188037 A1 | 7/2018 | Wheeler et al. | |
| 2018/0189323 A1 | 7/2018 | Wheeler | |
| 2018/0192059 A1* | 7/2018 | Yang | G01C 21/3841 |
| 2018/0203455 A1* | 7/2018 | Cronin | B60W 60/0011 |
| 2019/0271550 A1* | 9/2019 | Breed | G08G 1/205 |
| 2019/0283749 A1* | 9/2019 | Girond | B60W 40/04 |
| 2020/0364473 A1* | 11/2020 | Silver | G05D 1/0223 |

FOREIGN PATENT DOCUMENTS

| | | | |
|---|---|---|---|
| JP | 2007309670 A | 11/2007 | |
| JP | 2010282278 A | 12/2010 | |
| JP | 2013254443 A | 12/2013 | |
| JP | 2017062700 A | 3/2017 | |
| KR | 20150052272 A | 5/2015 | |
| KR | 20170015238 A | 2/2017 | |
| WO | 2014039200 A1 | 3/2014 | |
| WO | WO 2016-055917 A1 | 4/2016 | |
| WO | WO 2016-126317 A1 | 8/2016 | |
| WO | WO 2017-018850 A1 | 2/2017 | |

OTHER PUBLICATIONS

Office Action for Singapore Patent Application No. 11202005741Y, dated Jun. 25, 2021.
Australian Office Action for Application No. 2018395837 dated Dec. 4, 2020.
Japanese Office Action for Application No. 2020-534271 dated Dec. 2, 2020.
"Traffic Safety Sign Installation and Management Manual" Dec. 2011, 256 pages (Korean Language only).
Preliminary Rejection in KR Application No. 10-2020-7018714 with English translation, dated Sep. 29, 2020.
Extended European Search Report for Application No. 18897225.1 dated Feb. 12, 2021.
Examination Report for Australian Patent Application No. 2021203221, dated Aug. 4, 2022.
Notice of Reasons for Rejection for Japanese Patent Application No. 2021-119884, dated Aug. 18, 2022.

* cited by examiner

AUTONOMOUS VEHICLE SYSTEM CONFIGURED TO RESPOND TO TEMPORARY SPEED LIMIT SIGNS

CROSS REFERENCE TO RELATED APPLICATIONS

The present application is a continuation of U.S. patent application Ser. No. 15/857,952, filed Dec. 29, 2017, the disclosure of which is incorporated herein by reference.

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using cameras, radar, sensors, and other similar devices. The perception system executes numerous decisions while the autonomous vehicle is in motion, such as speeding up, slowing down, stopping, turning, etc. Autonomous vehicles may also use the cameras, sensors, and global positioning devices to gather and interpret images and sensor data about its surrounding environment, e.g., parked cars, trees, buildings, etc.

Information from the perception system may be combined with highly detailed map information in order to allow a vehicle's computer to safely maneuver the vehicle in various environments. This highly detailed map information may describe expected conditions of the vehicle's environment such as the shape and location of roads, traffic signals, and other objects. In this regard, the information from the perception system and detailed map information may be used to assist a vehicle's computer in making driving decisions involving intersections and traffic signals.

BRIEF SUMMARY

Aspects of the disclosure provide a computer-implemented method. The method includes using one or more computing devices to identify a speed limit sign in a vehicle's environment and identify a location and orientation corresponding to the speed limit sign. This method also includes using the one or more computing devices to determine whether the location and orientation of the identified speed limit sign corresponds to a pre-stored location and a pre-stored orientation of a speed limit sign that is pre-stored in map information and, when the location and orientation do not correspond to the pre-stored location and the pre-stored orientation, determine an effect zone of the identified speed limit sign based on the location and orientation of the identified speed limit sign and characteristics of surrounding areas or other detected object before or after the identified speed limit sign. In addition, this method includes using the one or more computing devices to determine a response of the vehicle based on the determined effect zone of the identified speed limit sign and control the vehicle based on the determined response.

In one example implementation, determining the effect zone of the identified speed limit sign includes determining a start point and an end point of the effect zone. In this implementation, the start point is optionally determined to be at a point of a road at a predetermined distance before the location, and the end point is optionally determined to be at a point of the road at a predetermined distance before a location of another speed limit sign. Alternatively for this implementation, the start point is determined to be a first point of a road where a speed change location begins, and the end point is determined to be a second point of the road where the speed change location ends.

In an additional example, determining the effect zone of the identified speed limit sign includes determining a confidence level for whether a speed limit on the identified speed limit sign applies to a point in a road. In this example, the confidence level is optionally determined to be higher for points of the road at or past the identified speed limit sign and before another speed limit sign than for points before the identified speed limit sign; higher for points of the road in a temporary speed change location than for points of the road outside the temporary speed change location; higher for points of the road at or past a first detected sign having text or symbols related to an upcoming change in speed for points of the road before the identified speed limit sign; and lower for points of the road at or past a second detected sign having text or symbols related to an end of the effect zone. Additionally or alternatively in this example, the effect zone is determined by comparing the confidence level to a first confidence threshold and a second confidence threshold. When a first point of the road has a first confidence level above the first confidence threshold, the first point of the road is determined to be a start point of the effect zone and, when a second point of the road has a second confidence level below the second confidence threshold, the second point of the road is determined to be an end point of the effect zone.

The method also includes, in a further example, using the one or more computing devices to detect a plurality of vehicles in the vehicle's environment and determine a speed of each of the plurality of vehicles in the vehicle's environment. In this example, determining the response of the vehicle is based also on the determined speed of each of the plurality of vehicles.

Other aspects of the disclosure provide for a system. The system includes a perception system configured to detect an object in a vehicle's environment at a detected location, a memory storing map information, and one or more computing devices. The one or more computing devices are configured to identify a speed limit sign in a vehicle's environment and identify a location and orientation corresponding to the identified speed limit sign. In addition, the one or more computing devices are configured to determine whether the location and orientation of the identified speed limit sign corresponds to a pre-stored location and a pre-stored orientation of a speed limit sign that is pre-stored in the map information and, when the location and orientation do not correspond to the pre-stored location and the pre-stored orientation of the pre-stored speed limit sign, determine an effect zone of the identified speed limit sign based on the location and orientation of the identified speed limit sign and characteristics of surrounding areas or other detected object before or after the identified speed limit sign. The one or more computing devices are additionally configured to determine a response of the vehicle based on the determined effect zone of the identified speed limit sign and control the vehicle based on the determined response.

In one example implementation, determining the effect zone of the identified speed limit sign includes determining a start point and an end point of the effect zone. In this implementation, the start point is optionally determined to be at a point of a road at a predetermined distance before the location of the identified speed limit sign, and the end point is optionally determined to be at a point of the road at a predetermined distance before a location of another speed limit sign. Alternatively, the start point is determined to be a first point of a road where a speed change location begins, and the end point is determined to be a second point of the road where the speed change location ends.

In another example, determining the effect zone of the identified speed limit sign includes determining a confidence level for whether a speed limit on the identified speed limit sign applies to a point in a road. The confidence level in this example is optionally determined to be higher for points of the road at or past the identified speed limit sign and before another speed limit sign than for points before the identified speed limit sign; higher for points of the road in a temporary speed change location than for points of the road outside the temporary speed change location; higher for points of the road at or past a first detected sign having text or symbols related to an upcoming change in speed; and lower for points of the road at or past a second detected sign having text or symbols related to an end of the effect zone. Additionally or alternatively in this example, the effect zone is determined by comparing the confidence level to a first confidence threshold and a second confidence threshold. When a first point of the road has a first confidence level above the first confidence threshold, the first point of the road is determined to be a start point of the effect zone and, when a second point of the road has a second confidence level below the second confidence threshold, the second point of the road is determined to be an end point of the effect zone.

The one or more computing devices, in a further example, are configured to detect a plurality of vehicles in the vehicle's environment, and determine a speed of each of the plurality of vehicles in the vehicle's environment. In this further example, determining the response of the vehicle is based also on the determined speed of each of the plurality of vehicles. In yet another implementation, the system also includes the vehicle.

Further aspects of the disclosure provide for a non-transitory, tangible computer-readable storage medium on which computer readable instructions of a program are stored. The instructions, when executed by one or more computing devices, cause the one or more computing devices to perform a method. The method includes identifying a speed limit sign in a vehicle's environment and identifying a location and orientation corresponding to the identified speed limit sign. The method also includes determining whether the location and orientation of the identified speed limit sign corresponds to a pre-stored location and a pre-stored orientation of a speed limit sign that is pre-stored in map information and, when the location and orientation do not correspond to the pre-stored location and the pre-stored orientation of the pre-stored speed limit sign, determining an effect zone of the identified speed limit sign based on the location and orientation of the identified speed limit sign and characteristics of surrounding areas or other detected object before or after the identified speed limit sign. In addition, the method also includes determining a response of the vehicle based on the determined effect zone of the identified speed limit sign and controlling the vehicle based on the determined response.

In an example implementation, determining the effect zone of the identified speed limit sign includes determining a confidence level for whether a speed limit on the identified speed limit sign applies to a point in a road. The confidence level in this example is determined to be higher for points of the road at or past the identified speed limit sign and before another speed limit sign than for points before the identified speed limit sign; higher for points of the road in a temporary speed change location than for points of the road outside the temporary speed change location; higher for points of the road at or past a first detected sign having text or symbols related to an upcoming change in speed; and lower for points of the road at or past a second detected sign having text or symbols related to an end of the effect zone.

Additionally or alternatively, determining the effect zone of the identified speed limit sign includes determining a confidence level for whether a speed limit on the identified speed limit sign applies to a point in a road by comparing the confidence level to a first confidence threshold and a second confidence threshold. In this implementation, when a first point of the road has a first confidence level above the first confidence threshold, the first point of the road is determined to be a start point of the effect zone and, when a second point of the road has a second confidence level below the second confidence threshold, the second point of the road is determined to be an end point of the effect zone.

DETAILED DESCRIPTION

Overview

Figure 1:
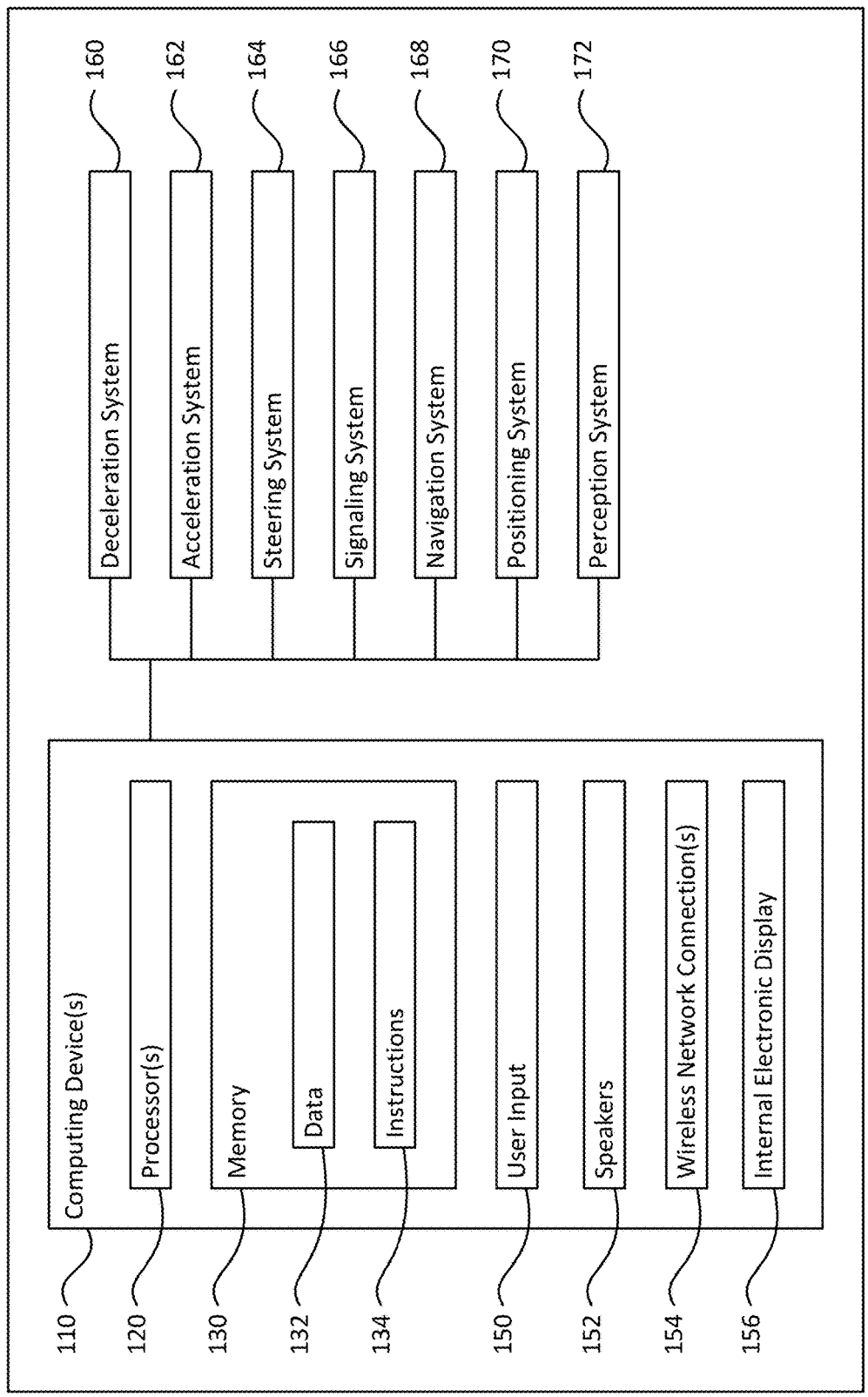
FIG. 1 is a functional diagram of an autonomous vehicle 100 in accordance with aspects of the disclosure.

The technology relates to determining a response of an autonomous vehicle to a temporary speed limit sign. When the perception system of the vehicle detects an object, the vehicle's computing devices may determine the location of the object and identify whether the object is a speed limit sign. When the object is classified as or determined to be a speed limit sign, then the vehicle's computing devices may determine whether the speed limit sign is permanent with general effect, permanent with local effect, or temporary based on pre-stored detailed map information and other factors.

The vehicle's computing device may then determine an effect zone of the permanent with general effect, permanent with local effect, or temporary speed limit sign. The effect zone is a section of road where the speed limit of the speed limit sign applies. For a speed limit sign that is permanent with general effect, a start point of the effect zone may be either at a point of the road at the location of the speed limit sign or a predetermined distance before the speed limit sign. For a speed limit sign that is permanent with local effect, a start point of the effect zone may be a start point of the speed change location associated with the speed limit sign that is permanent with local effect, and an end point of the effect zone may be an end point of the speed change location. For a temporary speed limit sign, a start point of the effect zone and an end point of the effect zone may be determined using a confidence level indicating whether the speed limit on the temporary speed limit sign applies to various points along the road. A higher confidence level may indicate that the speed limit is more likely to apply to a given point in the road and therefore is more likely be part of the effect zone.

The confidence level may be determined based on the location of the speed limit sign, characteristics of surrounding areas, and detected signs before and after the speed limit sign. As an example, points of the road at or past the speed limit sign and before another speed limit sign may have higher confidence levels. Points of the road within a predetermined distance before the speed limit sign may have higher confidence levels than points of the road farther away, or outside the predetermined distance before the speed limit sign. To determine confidence levels based on the characteristics of surrounding areas, for example, points of the road in a temporary speed change location may also have higher confidence levels than other points of the road. To also determine the confidence level based on other detected signs, for example, the vehicle's computing devices may extract text or symbols from the detected signs. When signs indicating change of speed limit or surrounding area is ahead are detected, the confidence level at points of the road after the detected sign may be increased. The confidence level may be increased within the indicated time period or at the indicated distance and decreased outside the indicated time period or distance. When signs indicating end of the effect zone are detected, the confidence level at points of the road after the detected sign may be lower than before the detected sign.

When the effect zone of the detected speed limit sign is determined, the vehicle's computing devices may determine how the vehicle should respond. This determination may be based on the effect zone or the effect zone confidence level. In some examples, the determined response may also be based on a detected flow of surrounding traffic. The vehicle's computing devices may then control the vehicle based on the determined response. Controlling the vehicle may involve decelerating, for instance, by applying a brake or accelerating, by applying input to an accelerator.

The features described herein may allow autonomous vehicles to react properly to different types of speed limit signs. As a result, users of autonomous vehicles then do not have to switch into manual operation to respond to speed limit signs. The features described enable the autonomous vehicle to distinguish among a permanent speed limit sign with general effect, a permanent speed limit sign with local effect, and a temporary speed limit. Then, autonomous vehicle may slow or speed up the appropriate amount based on its type. Users of such autonomous vehicles may experience a smoother ride without the need to pause autonomous operation in order to navigate through an area with different speed limit signs.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computing devices 110 that include one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of the vehicle's computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of the vehicle's computing devices 110. Accordingly, references to a processor or computing device will be understood to include references to a collection of processors or computing devices or memories that may or may not operate in parallel.

The vehicle's computing devices 110 may have all of the components normally used in connection with a computing device such as the processor and memory described above, as well as a user input device 150 (e.g., a mouse, keyboard, touch screen and/or microphone), various electronic displays (e.g., a monitor having a screen, a small LCD touch-screen or any other electrical device that is operable to display information), audio output (such as speakers 152), and a wireless network connection 154. In this example, the vehicle includes an internal electronic display 156. In this regard, internal electronic display 156 may be located within a cabin of vehicle 100 and may be used by the vehicle's computing devices 110 to provide information to passengers within the vehicle 100.

In one example, the vehicle's computing devices 110 may be an autonomous driving computing system incorporated into vehicle 100. The autonomous driving computing system may capable of communicating with various components of the vehicle as needed in order to control the vehicle in fully autonomous (without input from a driver) as well as semi-autonomous (some input from a driver) driving modes.

Figure 2:
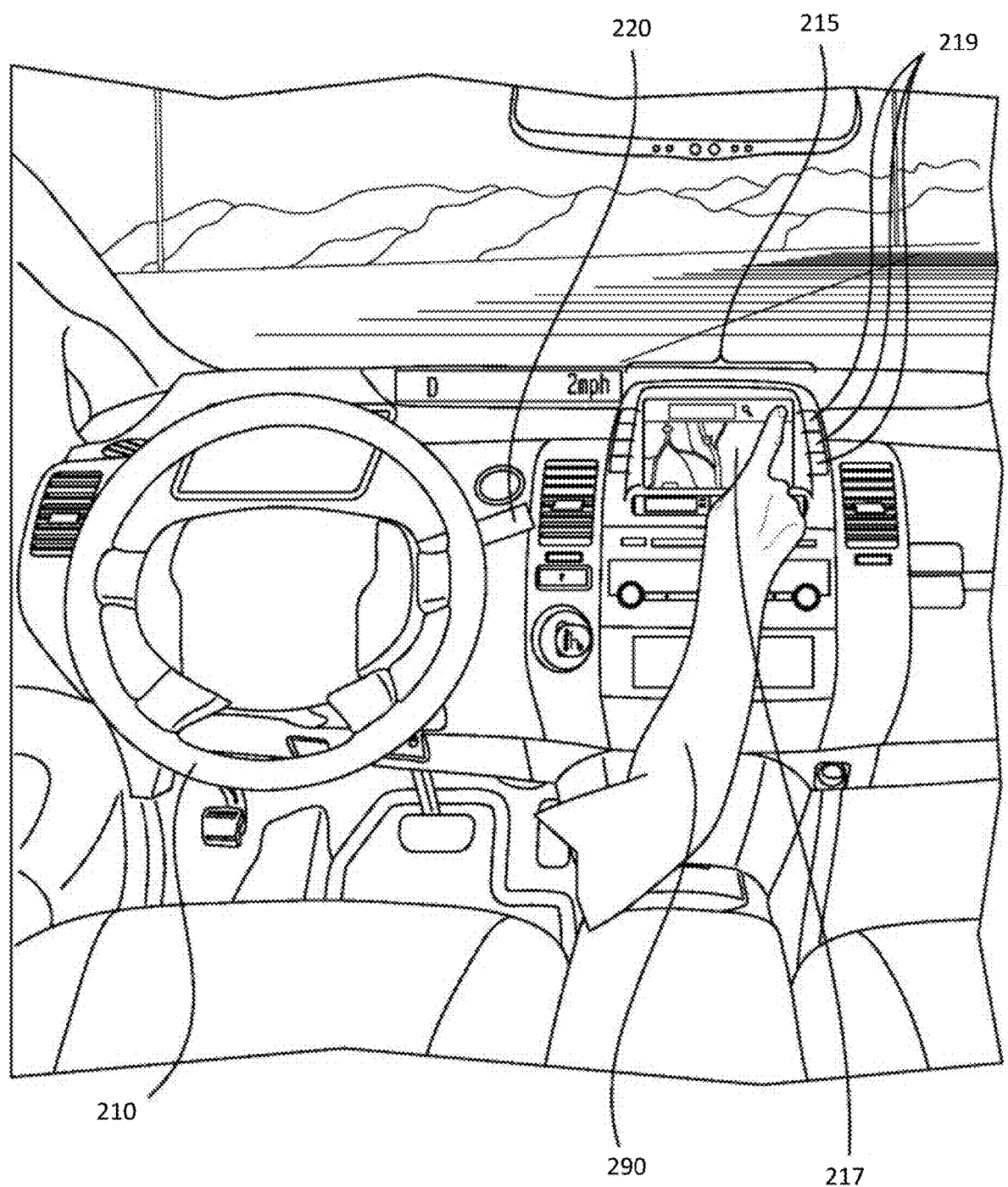
FIG. 2 is an interior of an autonomous vehicle in accordance with aspects of the disclosure.

As an example, FIG. 2 depicts an interior design of a vehicle having autonomous, semiautonomous, and manual (continuous input from a driver) driving modes. In this regard, the autonomous vehicle may include all of the features of a non-autonomous vehicle, for example: a steering apparatus, such as steering wheel 210; a navigation display apparatus, such as navigation display 215 (which may be a part of electronic display 156); and a gear selector apparatus, such as gear shifter 220. The vehicle may also have various user input devices 150 in addition to the foregoing, such as touch screen 217 (again, which may be a part of electronic display 156), or button inputs 219, for activating or deactivating one or more autonomous driving modes and for enabling a driver or passenger 290 to provide information, such as a navigation destination, to the vehicle's computing devices 110.

Returning to FIG. 1, when engaged, the vehicle's computing devices 110 may control some or all of these functions of vehicle 100 and thus be fully or partially autonomous. It will be understood that although various systems and the vehicle's computing devices 110 are shown within vehicle 100, these elements may be external to vehicle 100 or physically separated by large distances.

In this regard, the vehicle's computing devices 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to the vehicle's computing devices 110, in actuality, these systems may also be incorporated into the vehicle's computing devices 110, again as an autonomous driving computing system for controlling vehicle 100.

As an example, the vehicle's computing devices 110 may interact with deceleration system 160 and acceleration system 162 in order to control the speed of the vehicle. Similarly, steering system 164 may be used by the vehicle's computing devices 110 in order to control the direction of vehicle 100. For example, if vehicle 100 configured for use on a road, such as a car or truck, the steering system may include components to control the angle of wheels to turn the vehicle. Signaling system 166 may be used by the vehicle's computing devices 110 in order to signal the vehicle's intent to other drivers or vehicles, for example, by lighting turn signals or brake lights when needed.

Navigation system 168 may be used by the vehicle's computing devices 110 in order to determine and follow a route to a location. In this regard, the navigation system 168 and/or data 132 may store map information, e.g., highly detailed maps identifying the shape and elevation of roads, lane lines, intersections, crosswalks, speed limits, traffic signals, buildings, signs, real time traffic information, vegetation, or other such objects and information. Map information may also include information that describes the location of speed limit signs as well as speed limits for sections of road or zones.

Figure 3:
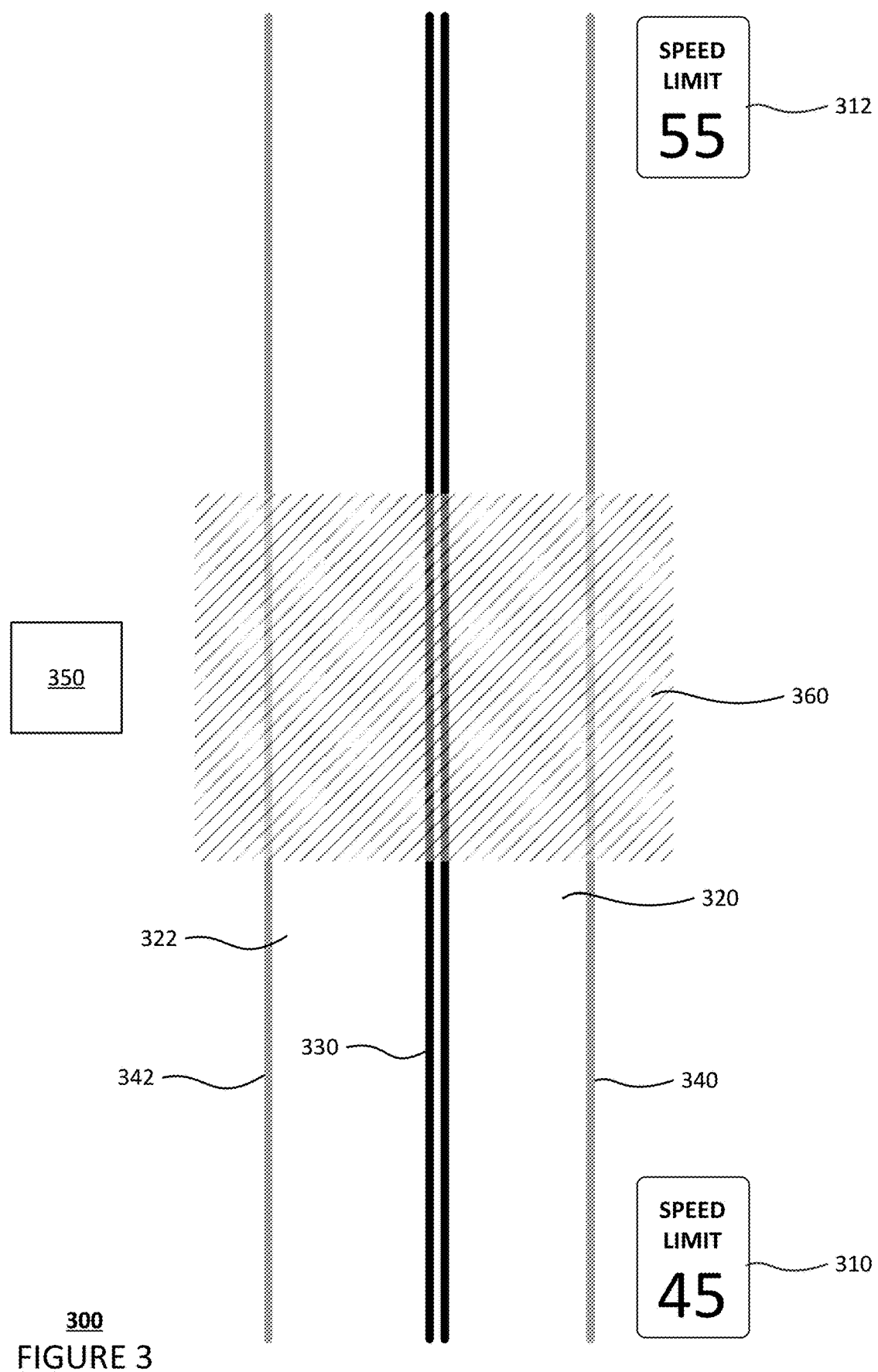
FIG. 3 is an example of detailed map information 300 in accordance with aspects of the disclosure.

FIG. 3 is an example of detailed map information 300 for a section of road. In this example, the detailed map information 300 includes information identifying the shape, location, and other characteristics of speed limit signs 310, 312, lanes 320, 322, lane lines 330, and curbs 340, 342. The speed limit signs 310, 312 may be indicated to be a particular type of speed limit sign. In this case, each of speed limit signs 310, 312 may be indicated to be a permanent speed limit sign with general effect. The detailed map information 300 also includes a building 350 and a speed change location 360 associated with the building 350. The speed change location is an area where the vehicle should adjust its speed either by law, for safety, or for passenger comfort. For instance, speed change locations include a school zone, a curve in the road, a section of road with residential houses within a second threshold distance of the road, a bridge, a ramp, a gravel road, blind turns, or occluded areas. The building 350 may be indicated to be a certain type of building in the detailed map information 300. In this example, the building 350 is a school building, and the speed change location 360 is a school zone.

Positioning system 170 may be used by the vehicle's computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the vehicle's computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the vehicle's computing devices 110, other computing devices and combinations of the foregoing.

The perception system 172 also includes one or more components for detecting and performing analysis on objects external to the vehicle such as other vehicles, obstacles in the road, traffic signals, signs, trees, etc. For example, the perception system 172 may include lasers, sonar, radar, one or more cameras, or any other detection devices which record data which may be processed by the vehicle's computing devices 110. In the case where the vehicle is a small passenger vehicle such as a car, the car may include a plurality of sensors which provide sensor data to the vehicle's computing devices. This sensor data may describe the shape and geographic location coordinates of objects detected in the vehicle's environment.

The vehicle's computing devices 110 may control the direction and speed of the vehicle by controlling various components. By way of example, if the vehicle is operating completely autonomously, the vehicle's computing devices 110 may navigate the vehicle to a location using data from the detailed map information and navigation system 168. The vehicle's computing devices 110 may use the positioning system 170 to determine the vehicle's location and perception system 172 to detect and respond to objects when needed to reach the location safely. In order to do so, the vehicle's computing devices 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Various components of the perception system 172 may be positioned on or in the vehicle 100 in order to better detect external objects while the vehicle is being driven. In this regard, the plurality of sensors, such as laser range finders may be positioned or mounted on the vehicle. As an example, the vehicle's computing devices 110 may control laser range finder, e.g., by rotating it 180 degrees. In addition, the perception system may include one or more cameras mounted internally on the windshield of vehicle 100 to receive and analyze various images about the environment. In addition to the laser range finder is positioned on top of perception system 172, and the one or more cameras mounted internally on the windshield, other detection devices, such as sonar, radar, GPS, etc., may also be positioned in a similar manner.

The vehicle's computing devices 110 may also include features such as transmitters and receivers that allow the one or more devices to send and receive information to and from other devices. For example, the one or more computing devices may determine information about the position of a speed limit sign as well as information about speed change locations. The one or more computing devices may send this information to other computing devices associated with other vehicles.

Example Methods

As the vehicle 100 moves through its environment, the perception system 172 detects and identifies various objects in the vehicle's environment. When the perception system 172 of the vehicle 100 detects an object, the vehicle's computing devices 110 may determine the location and/or orientation of the object and identify whether the object is a speed limit sign. To determine whether the object is a speed limit sign, the text on the object may be determined. The object may be classified as a speed limit sign when the text on the object includes "speed limit," "mph," "kph," a number, etc. For example, as shown in the example scenario of FIG. 4, in which the vehicle 100 travels through the section of road corresponding to the detailed map information 300 in FIG. 3, the perception system 172 of vehicle 100 detects two objects 410, 412 down a section of road 400 and to the right hand side of the vehicle 100. The vehicle's computing devices 110 identifies the detected objects as speed limit signs by detecting the words "speed limit" and the number "45" on the first object 410 and the words "speed limit" and the number "55" on the second object 412.

When the detected object is identified as a speed limit sign, then the vehicle's computing devices 110 may determine whether the speed limit sign is permanent with general effect, permanent with local effect, or temporary based on the pre-stored detailed map information and other factors. Examples of each of these determinations are described in turn below.

The speed limit sign may be determined to be permanent with general effect (i.e., not temporary) when the location of the identified speed limit sign corresponds to a pre-stored location of a speed limit sign in the pre-stored detailed map information. In some examples, the determination may be made when both the location and orientation of the identified speed limit sign corresponds to a prestored location and a pre-stored orientation of a speed limit sign in the pre-stored detailed map information. In the example shown in FIG. 4, the vehicle's computing devices 110 may detect and identify objects in a section of road 400 that includes a speed limit sign. In this example, some of the detected objects are identified as a speed limit sign 410, lanes 420, 422, lane lines 430, curbs 440, 442, a building 450, and a speed change location 460. The one or more of the detected objects in the vehicle's environment may correspond with objects stored in the detailed map information, as shown in detailed map information 300, which may also store other information identifying the shape, location, orientation, and other characteristics of the objects. The vehicle's computing devices 110 may determine that the identified speed limit sign 410 is a permanent speed limit sign with general effect based on whether the location and orientation of the identified speed limit sign corresponds with a location and orientation of the speed limit sign 310 in the detailed map information. When the locations do correspond, as in the examples of FIGS. 3 and 4, the identified speed limit sign 410 is determined to be the same type of speed limit sign as the speed limit sign 310, which is a permanent speed limit sign with general effect. The locations may be determined to correspond when the locations are within a predetermined distance, such as 5 feet or more or less, from one another. The orientations may be determined to correspond when the orientations are within a predetermined angle, such as 10 degrees or more or less, from one another. The predetermined distance may be based on how an accuracy of the detailed map information, where the predetermined distance is smaller for map information having higher accuracy and bigger for map information having lower accuracy. In same or similar ways, the speed limit sign 412 may also be determined to correspond with the speed limit sign 312 in the pre-stored detailed map information and there may be determined to be a permanent speed limit sign with general effect.

Figure 5:
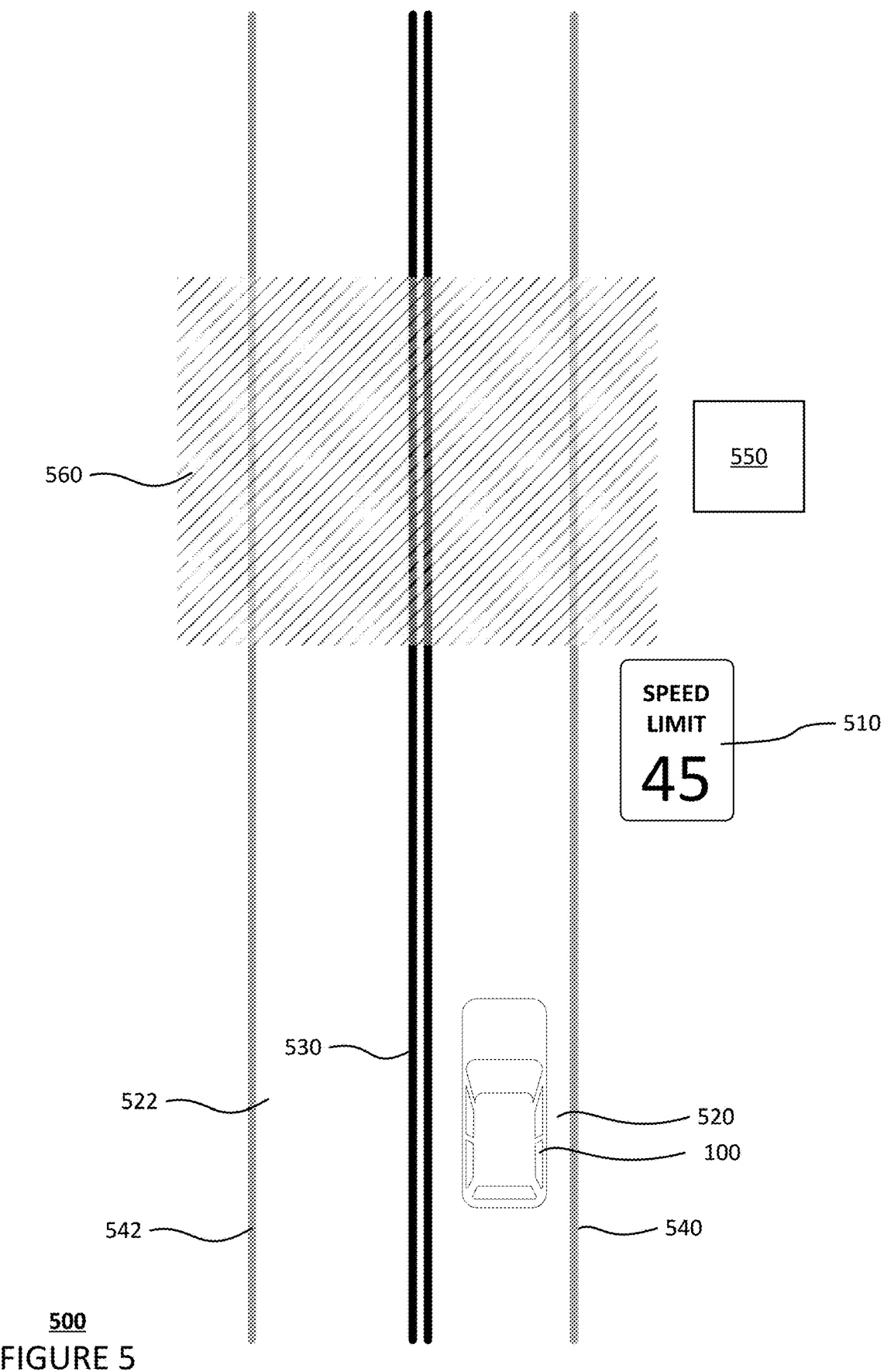
FIG. 5 is an example diagram of an example scenario and another section of road in accordance with aspects of the disclosure.

In addition, the speed limit sign may be determined to be permanent with general effect when the speed limit on the speed limit sign corresponds to a speed limit in the pre-stored detailed map information for a section of road including the location and/or orientation of the speed limit sign. The section of road may be identified as a speed change location, such as a school zone, in the pre-stored detailed map information. As shown in the example scenario of FIG. 5, the vehicle's computing devices 110 may detect and identify objects in a section of road 500 that includes a speed limit sign located near a school zone. In this example, some of the detected objects are identified as a speed limit sign 510, lanes 520, 522, lane lines 530, curbs 540, 542, a building 550, and a speed change location 560. Again, one or more of the detected objects may correspond with objects stored in the detailed map information, which may also store other information identifying the shape, location, orientation, and other characteristics of the objects. In the detailed map information, the building 550 may be indicated to be a school building, and the speed change location 560 may be indicated to be a school zone. The speed change location 560 may also be indicated to have a speed limit of 45 mph in the detailed map information. In some implementations, the determination that the speed limit sign is permanent with general effect may be based on the location and/or orientation corresponding with the pre-stored location and the pre-stored orientation as well as the speed limit corresponding to the pre-stored speed limit.

The vehicle's computing devices 110 may determine that the speed limit sign 510 is a permanent speed limit sign with general effect when the location of the speed limit sign is proximate to a speed change location and a number on the speed limit sign matches the speed limit of the speed change location. In the example shown in FIG. 5, the vehicle's computing devices 110 determine that the speed limit sign 510 is located within a set distance from a section of road that is indicated to be a speed change location 560 in the pre-stored detailed map information 300. The set distance may be, for example, 50 feet, 100 feet, or another distance. The vehicle's computing devices 110 may determine that the number on the speed limit sign is 45 mph and determine that the number matches the speed limit of the speed change location 560 in the detailed map information. As a result, the speed limit on the speed limit sign 510 is determined to be a permanent speed limit sign having general effect in the speed change location 560.

Alternatively, when a speed change location is not identified in the detailed map information, the vehicle's computing devices 110 may determine that a speed change location exists along a section of road adjacent to a type of building associated with a speed change by law, for safety, or for passenger comfort. When the building 550 is indicated to be a school building in the detailed map information, the vehicle's computing devices 110 may determine that the section of road adjacent to the building 550 is a speed change location.

The identified speed limit sign may be determined to be permanent with local effect (i.e., also not temporary) when the identified location of the speed limit sign corresponds to specific characteristics, such as the identified location is a first threshold distance off the road, such as 3 feet or more or less from a curb, and is also along a section of road that has characteristics corresponding to a speed change location.

Figure 6:
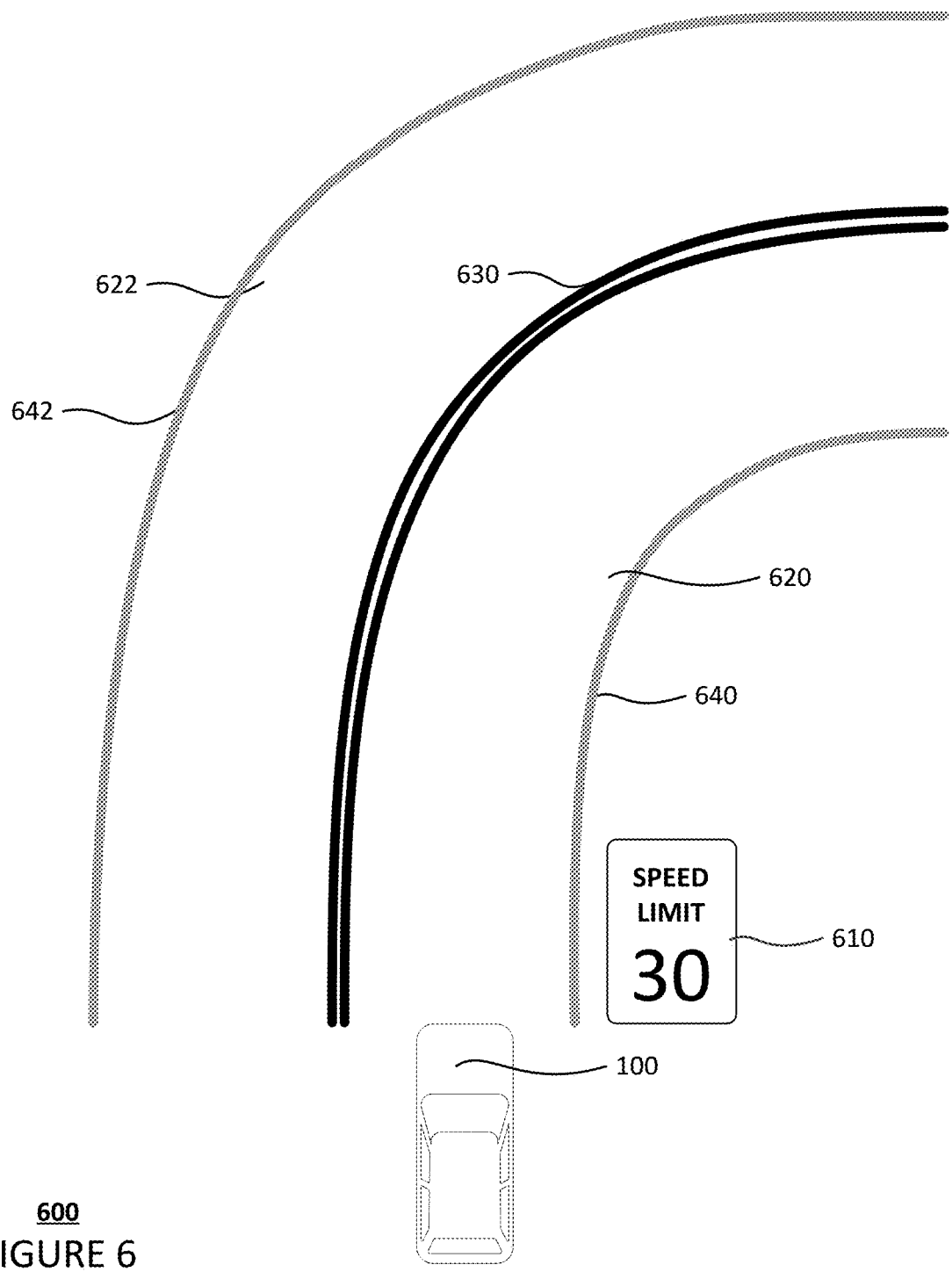
FIG. 6 is an example diagram of an example scenario and yet another section of road in accordance with aspects of the disclosure.

In the example shown in FIG. 6, the vehicle's computing devices 110 may detect and identify objects and characteristics in a section of road 600 that includes a speed limit sign located near a school zone. Some of the detected objects are identified as speed limit sign 610, lanes 620, 622, lane lines 630, and curbs 640, 642. One or more of the detected objects may correspond with objects stored in the detailed map information, which may also store other information identifying the shape, location, orientation, and other characteristics of the objects. In addition, the detected characteristics of the section of road 600 may include a curvature of the road, or curve. In some implementations, the detected characteristics of the section of the road 600 may also be pre-stored in the detailed map information.

The vehicle's computing devices 110 may determine that the section of road 600 is a speed change location based on the detected curvature of the road at the section of road 600. This determination of the speed change location may be based on, for example, an amount of curvature greater than a threshold curvature, one or more other signs indicating a curve or a speed change, or an indication that is pre-stored in the detailed map information.

The vehicle's computing devices 110 may determine that the speed limit sign 610 is a permanent speed limit sign with local effect based on the location of the speed limit sign proximate to a speed change location. In the example shown in FIG. 6, the vehicle's computing devices 110 determine that the speed limit sign 610 is located within a set distance from a section of road that has characteristics associated with a speed change location. The set distance may be, for example, 50 feet, 100 feet, or another distance. As a result, the speed limit on the speed limit sign 610, which is 30 mph, is determined to have local effect in the speed change location.

The identified speed limit sign may be determined to be temporary when (i) the speed limit sign is not determined to be permanent as described above, (ii) the location of the speed limit sign is a temporary location, (iii) the speed limit sign has one or more characteristics associated with a temporary speed limit sign, or (iv) the speed limit sign is located proximate to a temporary speed change location. Temporary locations include locations that are within the first threshold distance off the road or locations that are on the road itself. Characteristics associated with a temporary speed limit sign includes a height that is lower than a threshold height, a base having wheels, types of colors, an angle of the sign, an angle or shape of a base, or proximity with other temporary signs.

Figure 7:
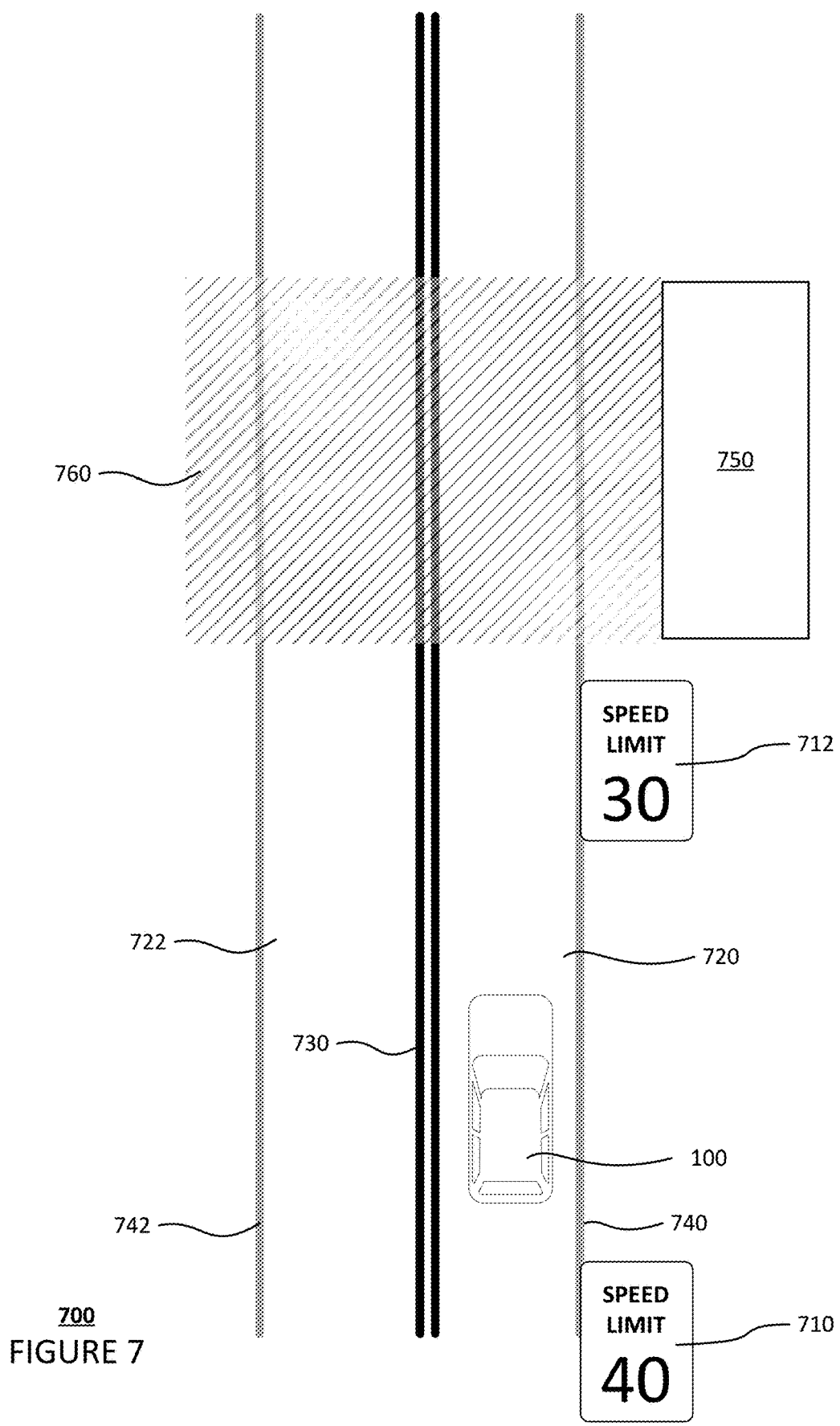
FIG. 7 is an example diagram of an example scenario and a further section of road in accordance with aspects of the disclosure.

In the example shown in FIG. 7, the vehicle's computing devices 110 may detect and identify objects and characteristics in a section of road 700 that includes speed limit signs located near a temporary speed change location corresponding to a geographic area 750. Some of the detected objects are identified as speed limit signs 710, 712, lanes 720, 722, lane lines 730, and curbs 740, 742. One or more of the detected objects may correspond with objects stored in the detailed map information, which may also store other information identifying the shape, location, orientation, and other characteristics of the objects.

For speed limit sign 710, the vehicle's computing devices 110 may determine that speed limit sign 710 is a temporary speed limit sign because (i) the location of the speed limit sign 710 does not correspond to a location of a speed limit sign in the pre-stored detailed map information and (ii) the speed limit on the speed limit sign 710 does not correspond to a speed limit in the pre-stored detailed map information for a section of road including the detected location. Alternatively, the vehicle's computing devices 110 may determine that speed limit sign 710 is a temporary speed limit sign based on the location of speed limit sign 710 being within the first threshold distance from the curb 740, such as one foot, and/or a height of the speed limit sign 710 (from the ground to the bottom of the speed limit sign) is below a threshold height, such as seven feet.

For speed limit sign 712, the vehicle's computing devices 110 may determine that the speed limit sign 712 is a temporary speed limit sign based on the location of the speed limit sign 712 proximate to a temporary speed change location. The vehicle's computing devices 110 may determine that a temporary speed change location exists where a zone associated with a temporary speed change is detected in an area, such as the geographic area 750. Within the geographic area 750, the vehicle's computing devices 110 may detect one or more objects associated with a temporary speed change location, such as a school zone or a construction zone in a geographic area adjacent a section of road. The one or more objects that are associated with a school zone may include, for example, a school building, a crossing guard, or another sign indicating a speed change. The one or more objects that are associated with a construction zone may include, for example, a traffic cone, a construction vehicle, a temporary barrier, a construction worker, or another temporary sign. In the scenario shown in FIG. 7, a plurality of the objects associated with a construction zone may be detected in the geographic area 750. The geographic area 750 may therefore be determined to be a construction zone.

When the geographic area 750 is determined to be a temporary speed change location, the vehicle's computing devices 110 may determine that the points of the road adjacent to the geographic area 750 is a temporary speed change location, such as the temporary speed change location 760. Alternatively, sections of roads in the in the detailed map information may be indicated in the detailed map information as temporary speed change locations. The vehicle's computing devices 110 may determine that the location of the speed limit sign 712 is within a set distance from the temporary speed change location in the geographic area 750, and that the speed limit sign 712 is a temporary speed limit sign. The set distance may be, for example, 50 feet, 100 feet, or another distance.

The vehicle's computing devices 110 may then determine an effect zone of the permanent with general effect, permanent with local effect, or temporary speed limit sign. The effect zone is a section of road where the speed limit of the speed limit sign applies. For a speed limit sign that is permanent with general effect, a start point of the effect zone may be either at a point of the road at the location of the speed limit sign or a predetermined distance before the speed limit sign. The predetermined distance may be determined based on laws of applicable in the geographic area including the location of the speed limit sign.

Figure 4:
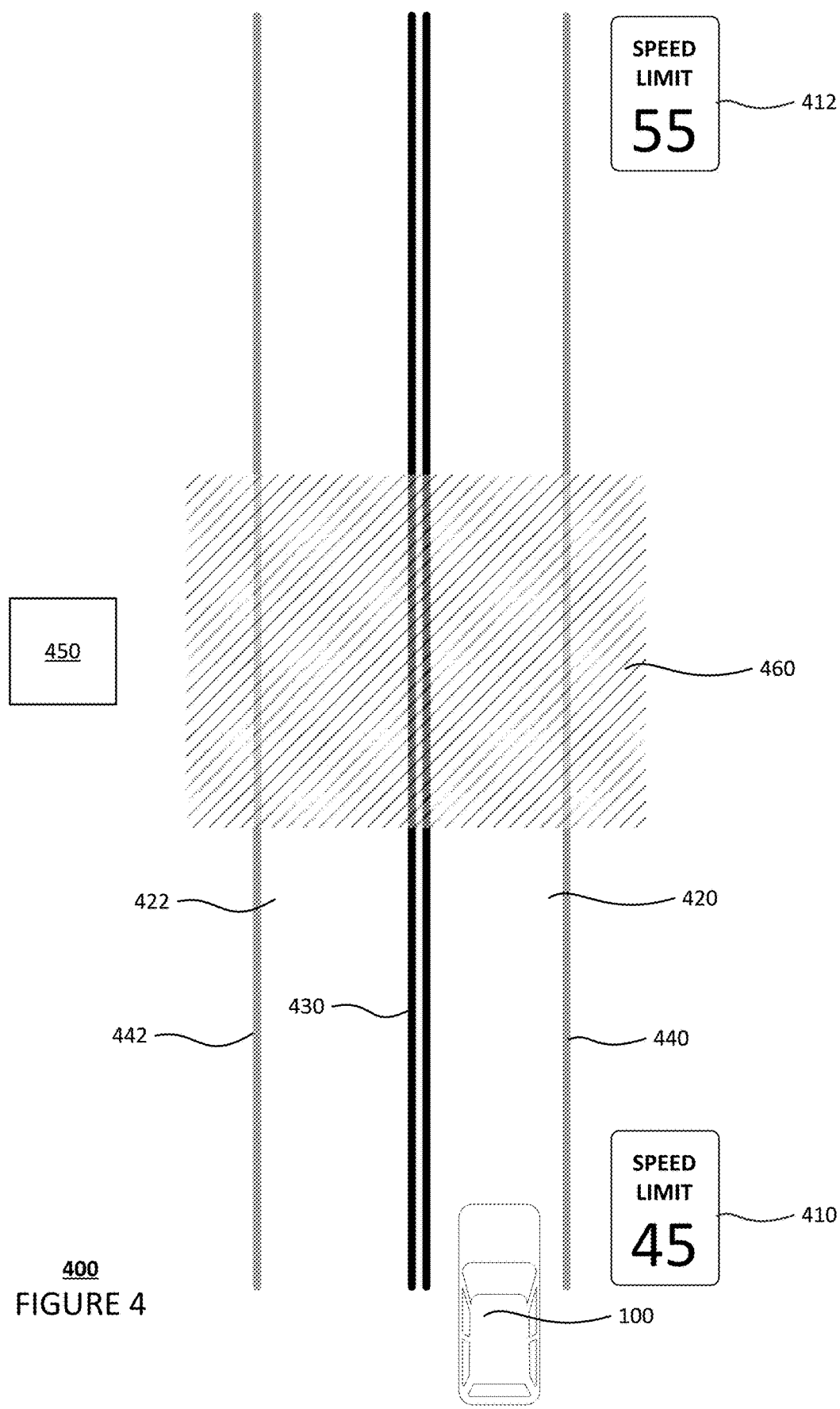
FIG. 4 is an example diagram of an example scenario and a section of road in accordance with aspects of the disclosure.

In some geographic areas, for example the geographic area shown in FIG. 4, the effect zone of a speed limit sign 410 that is determined to be permanent with general effect may start at a start point 50 feet or more or less ahead of the location of the speed limit sign 410. An end point of the effect zone for a speed limit sign that is permanent with general effect may be a start point of another speed limit sign along the road. For the speed limit sign 410, the end point may be the start point of speed limit sign 412, which may be 50 feet or more or less ahead of the location of speed limit sign 412. In other examples, such as the example in FIG. 5, the start point and end point of the speed limit sign 510 that is determined to be permanent with general effect may be a start point and end point of a zone identified in the pre-stored detailed map information, such as speed change location 560.

For a speed limit sign that is permanent with local effect, a start point of the effect zone may be a start point of the speed change location associated with the speed limit sign that is permanent with local effect, and an end point of the effect zone may be an end point of the speed change location. For example, as discussed above with respect to in FIG. 6, the speed change location may be a curve in the road, such as the curve in section of the road 600, and the effect zone may be the curve in the road. The effect zone for speed limit sign 610 may therefore be between the start of the section of the road 600 and the end of the section of the road 600. In other examples, the start point and the end point may be determined as described above with respect to permanent speed limit signs with general effect.

For a temporary speed limit sign, such as speed limit signs 710, 712 shown in FIG. 7, a start point of the effect zone and an end point of the effect zone may be determined using a confidence level indicating whether the speed limit on the temporary speed limit sign applies to various points along the road. The value of a confidence level may be a percentage, a number on a scale, or other type of quantifier that may be used to indicate confidence level. A higher confidence level may indicate that the speed limit is more likely to apply to a given point in the road and therefore is more likely be part of the effect zone. As an example, a first point of the road that has a confidence level that exceeds a first or upper confidence threshold, such as 70% or more or less, may be determined as the start point of the effect zone. A second point of the road further downstream from the first point of the road that has a confidence level that falls below a second or lower confidence threshold, such as 30% or more or less, may be determined as the end point of the effect zone. In other implementations, the upper confidence threshold and the lower confidence threshold may be the same, such as 50% or more or less.

The confidence level may be determined based on the location of the speed limit sign, characteristics of surrounding areas, detected signs before and after the speed limit sign, and detected vehicles on the road. As an example, points of the road at or past the speed limit sign and before a next speed limit sign may have higher confidence levels than at or past the next speed limit sign or before the speed limit sign. Points of the road within a predetermined distance, such as 50 feet, 100 feet, or another distance, before the speed limit sign may have higher confidence levels for the speed limit sign than points of the road farther away, or outside the predetermined distance, before the speed limit sign. Similarly, points of the road within the predetermined distance before a next speed limit sign may have lower confidence levels for the speed limit sign than points of the road outside the predetermined distance from the next speed limit sign.

Referring to the example in FIG. 7, the points of the road between speed limit signs 710 and 712 may have a higher confidence level than the points of the road after the speed limit sign 712 and before the speed limit sign 710. The points of the road within 50 feet in front of the speed limit sign 710 may have a higher confidence level for the speed limit sign 710 than the points of the road more than 50 feet in front of the speed limit sign 710. In addition, the points of the road within 50 feet in front of the speed limit sign 712 may have a lower confidence level for the speed limit sign 710 than the points of the road more than 50 feet in front of the speed limit sign 712. The confidence level for the speed limit sign 710 may be above the upper confidence threshold for points of the road starting at or about 50 feet in front of the speed limit sign 710. In addition, the confidence level for the speed limit sign 710 may drop below the lower confidence threshold for points of the road at or about 50 feet in front of the speed limit sign 712. The effect zone for the speed limit sign 710 may therefore be between at or about 50 feet in front of the speed limit sign 710 and at or about 50 feet in front of the speed limit sign 712.

To determine confidence levels based on the characteristics of surrounding areas, for example, points of the road in a temporary speed change location may also have higher confidence levels than other points of the road for a speed limit sign that is within a set distance from the temporary speed change location. Points of the road after the temporary speed change location may have a lower confidence level for the speed limit sign that is within the set distance from the temporary speed change location. The set distance may be 50 feet, 100 feet, or other distance. In addition, when an additional traffic cone is detected at a point of the road after the end of the temporary speed change location, the points of the road between the end of the temporary speed change location and the point of the road may have a higher confidence level. When no additional traffic cones are detected at points of the road farther down the road, the confidence level may be lower for the speed limit sign. As discussed above with respect to geographic area 750 in FIG. 7, temporary speed change locations may be identified in the pre-stored detailed map information, while other temporary speed change locations may be detected by the vehicle's computing devices 110 using the perception system 172 when the vehicle 100 is in proximity. For the speed limit sign 712, the points of the road in the temporary speed change location 760, have a higher confidence level than other points of the road. Points of the road after the temporary speed change location 760 may have a lower confidence level than points of the road within the temporary speed change location 760 or near the speed limit sign 712. The effect zone for speed limit sign 712 may be between at or about 50 feet in front of the speed limit sign 712 and the end of the temporary speed change location 760.

To also determine the confidence level based on other detected signs, for example, the vehicle's computing devices 110 may extract text or symbols from the detected signs. Signs that indicate a change of speed limit or surrounding area is ahead may have text such as "slow ahead," "construction ahead," "men at work," etc. When signs indicating change of speed limit or surrounding area is ahead are detected, the confidence level at points of the road after the detected sign may be increased. The other detected signs may also indicate a time period or distance at which a speed limit change or surrounding area change may begin or end. For example, the text of the detected signs may recite "construction in 1000 feet," "lane closures between 7 pm and 6 am starting August 15," "speed limit when children are present," etc. The confidence level may be increased to exceed the upper confidence threshold within the indicated time period or at the indicated distance and decreased to below the upper or lower confidence threshold outside the indicated time period or distance. In addition, other detected signs may indicate when the effect zone ends, such as a sign stating "end road work" or "end construction." When signs indicating end of the effect zone are detected, the confidence level at points of the road after the detected sign may be lower than before the detected sign and below the lower confidence threshold.

The computing devices may also determine the confidence level based on other vehicles detected by the perception system 172. For example, the vehicle's computing devices 110 detect that one or more detected vehicles begin to change speed at a same or similar point of the road. The one or more detected vehicles may be detected to either accelerate or decelerate. When the point of the road is before a temporary speed limit sign, the confidence level between the point of the road and the location of the temporary speed limit sign may be increased. When the point of the road is after or beyond a temporary speed limit sign, the confidence level between the location of the temporary speed limit sign and the point of the road may be decreased. In some examples, the start point and the end point of the permanent speed limit signs with general or local effect may also be determined based on a point of the road where one or more detected vehicles begin to change speed.

In addition to or as an alternative to using the confidence level, the start point of the effect zone and the end point of the effect zone may be determined for the temporary speed limit sign using same or similar methods as described above with respect to the permanent speed limit sign with general or local effect. For example, the start point may be 50 feet or more or less ahead of the location of the temporary speed limit sign, such as speed limit sign 710. The end point may be a start point of another speed limit sign along the road, such as 50 feet or more or less ahead of the location of speed limit sign 712. In another implementation, the start point may be a start point of the temporary speed change location associated with the temporary speed limit sign, such as the temporary speed change location 760, which is associated with the temporary speed limit sign 712. The end point for the temporary speed limit sign in this implementation may be an end point of the temporary speed change location.

The determination of the effect zone may be updated at regular intervals, such as every few seconds or every few yards, and/or when a new object is detected. For temporary speed limit signs, the confidence level at each point of the road may be updated based on newly detected objects. For example, when a traffic cone is newly detected at a point of the road farther down the road than a determined end of an effect zone, the end of the effect zone may be updated to be at the location of the newly detected traffic cone.

When the effect zone of the detected speed limit sign is determined, the vehicle's computing devices 110 may determine how the vehicle 100 should respond. This determination may be based on the effect zone or the effect zone confidence level. The vehicle's computing devices 110 may determine when to adjust the vehicle's speed so as to be within the speed limit on the speed limit sign at or slightly after the start point of the speed limit sign's effect zone. The vehicle's computing devices 110 may also determine when to adjust the vehicle's speed so as to resume a previous speed limit or be within a speed limit on a next speed limit sign at or slightly after the end point of the speed limit sign's effect zone. In examples involving temporary speed limit signs, the vehicle's speed may be adjusted based on the effect zone confidence level at a point of the road. As the confidence level increases, the vehicle's speed may be adjusted closer to the speed limit of the speed limit sign.

In some examples, the determined response may also be based on a detected flow of surrounding traffic. The perception system 172 of the vehicle may detect surrounding vehicles and their speeds. When an effect zone confidence level for a given point of the road or a given section of the road is below the upper confidence threshold, the vehicle's computing devices 110 may compare the speeds of the surrounding vehicles with the detected speed limit to determine whether the vehicle should operate based on the speed limit of the detected speed limit sign at the given point or section of the road. When a percentage of the surrounding vehicles, such as 30%, are being operated within the determined speed limit, the vehicle's computing devices 110 may determine that the vehicle should operate based on the speed limit of the detected speed limit sign.

Rather than observing the speed of other vehicles at any given point or points in time to determine their relative speeds, the computing devices 110 may use information from the perception system 172 to make determinations about the "flow" of traffic. For example, if all vehicles are stopped, the computing devices 110 may determine that there is no such flow or there is no flow to measure. However, if one or more other vehicles are slowing down when approaching a stop sign, the computing devices 110 may determine that the flow of traffic is slowing down and stopping at the stop sign. The computing devices may also observe how these one or more other vehicles behave after passing the stop sign, or rather, to what new speed these one or more other vehicles accelerate to after the stop sign. These observations may be combined to identify the flow of the traffic before and after the stop sign: slowing down and stopping for the stop sign, and thereafter accelerating to the new speed. As another example, in heavy traffic conditions, all vehicles may be moving slowly, for instance below the speed limit, both before and after the stop sign whether or not it is permanent or temporary. As such determining the flow of such vehicles may be more difficult, but still possible.

The vehicle's computing devices 110 may then control the vehicle 100 based on the determined response or flow of traffic. Controlling the vehicle 100 may involve decelerating using the deceleration system 160 or accelerating using the acceleration system 162 such that the vehicle is traveling at a speed according to the speed limit for a given point of the road.

Figure 8:
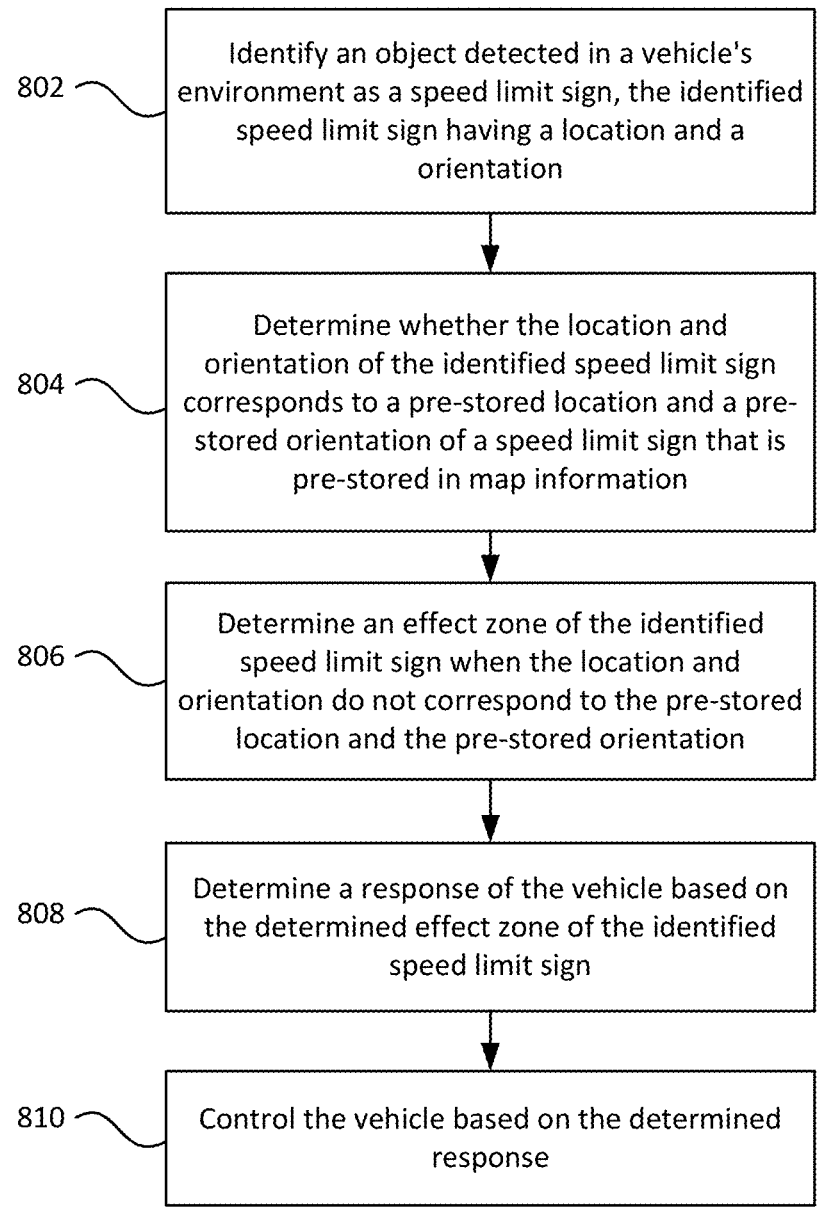
FIG. 8 is an example flow diagram in accordance with aspects of the disclosure.

In FIG. 8, flow diagram 800 depicts a method of controlling the vehicle 100 according to aspects of the disclosure described above. The method may be performed by the vehicle's computing devices 110. While FIG. 8 shows blocks in a particular order, the order may be varied and that multiple operations may be performed simultaneously. Also, operations may be added or omitted.

At block 802, an object detected in a vehicle's environment may be identified, or classified, by the vehicle's computing devices 110 as a speed limit sign, such as one of speed limit signs 410, 412, 510, 610, 710, or 712. The identified speed limit sign may be detected at a detected location and having a detected orientation. The classification may be based on detected words or numbers on the detected object, as described above.

At block 804, the vehicle's computing devices 110 may determine whether the detected location of the identified speed limit sign corresponds to a pre-stored location of a speed limit sign that is pre-stored in map information. For example, the detected location of the speed limit signs 410, 412, for example, corresponds with the pre-stored location of the speed limit signs 310, 312 in detailed map information 300. The detected locations of speed limit signs 510, 610, 710, and 712 may not correspond with the pre-stored locations of any speed limit signs in the detailed map information. In some examples, the vehicle's computing devices 110 may also determine whether the detected orientation of the identified speed limit sign corresponds to a pre-stored orientation of the speed limit sign that is pre-stored in map information. For example, the detected orientation of the speed limit signs 410, 412, for example, corresponds with the pre-stored orientation of the speed limit signs 310, 312 in detailed map information 300. The detected orientation of speed limit signs 510, 610, 710, and 712 may not correspond with the pre-stored orientations of any speed limit signs in the detailed map information.

At block 806, an effect zone of the identified speed limit sign may be determined when the identified speed limit sign does not correspond to the pre-stored location and/or the pre-stored orientation of the pre-stored speed limit sign. The effect zone may be determined based on the detected location of the detected speed limit sign, characteristics of surrounding areas, and at least one other detected object before or after the speed limit sign. For speed limit sign 510, for instance, the effect zone may be determined to be within the speed change location 560, which is detected or identified in the surrounding area. For speed limit sign 610, the effect zone may be determined to be within the section of road 600 based on the curvature characteristic of the section of road 600. For speed limit sign 710, the effect zone may be determined to be between at or about 50 feet in front of the speed limit sign 710 and at or about 50 feet in front of the speed limit sign 712 based on the detected locations of speed limit signs 710, 712. For speed limit sign 712, the effect zone may be determined to be between at or about 50 feet in front of the speed limit sign 712 and the end of the temporary speed change location 760 based on the detected location of the speed limit sign 712 and the characteristics of geographic area 750 and the temporary speed change location 760.

At block 808, the vehicle's computing devices 110 may determine a response of the vehicle 100 based on the determined effect zone of the detected speed limit sign. The vehicle's computing devices 110 may determine what speed limit at which to operate the vehicle 100 at each point or section of road. At block 810, the vehicle 100 may be controlled by the vehicle's computing devices 110 based on the determined response.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
   identifying, by one or more computing devices, a speed limit sign in a vehicle's environment that is positioned along a road;
   determining, by the one or more computing devices, an effect zone of the identified speed limit sign relative to the road based on characteristics of surrounding areas or another detected object along the road; and
   controlling, by the one or more computing devices, the vehicle based on the determined effect zone of the identified speed limit sign.

2. The method of claim 1, wherein determining the effect zone of the identified speed limit sign relative to the road includes determining whether the identified speed limit sign corresponds to a speed limit sign that is pre-stored in map information.

3. The method of claim 2, wherein when the identified speed limit sign corresponds to a permanent speed limit sign that is pre-stored in map information, determining the effect zone of the identified speed limit sign is based on the map information.

4. The method of claim 1, wherein determining the effect zone of the identified speed limit sign relative to the road includes determining the effect zone is for a speed change location when the identified speed limit sign is within a set distance of an area that has characteristics associated with the speed change location or an object associated with the speed change location.

5. The method of claim 4, wherein the speed change location is a curve in the road, and the effect zone is for the curve in the road.

6. The method of claim 1, further comprising determining that the identified speed limit sign is a temporary speed limit sign or a permanent speed limit sign based on a location of the identified speed limit sign relative to the road.

7. The method of claim 1, wherein determining the effect zone of the identified speed limit sign includes determining a start point and an end point of the effect zone.

8. The method of claim 7, wherein the start point is determined to be at a point of a road at a predetermined distance before a location of the identified speed limit sign, and the end point is determined to be at a point of the road at a predetermined distance before a location of another speed limit sign.

9. A system comprising:
a perception system configured to detect an object in a vehicle's environment; and
one or more computing devices configured to:
detect, using the perception system, a speed limit sign in the vehicle's environment that is positioned along a road;
determine an effect zone of the detected speed limit sign relative to the road based on characteristics of surrounding areas or another detected object along the road; and
control the vehicle based on the determined effect zone of the detected speed limit sign.

10. The system of claim 9, wherein determining the effect zone of the detected speed limit sign relative to the road is based on whether the detected speed limit sign corresponds to a speed limit sign that is pre-stored in map information.

11. The system of claim 10, wherein when the detected speed limit sign corresponds to a permanent speed limit sign that is pre-stored in map information, determining the effect zone of the detected speed limit sign is based on the map information.

12. The system of claim 9, wherein determining the effect zone of the detected speed limit sign relative to the road based on a speed change location that is within a set distance from the detected speed limit sign.

13. The system of claim 12, wherein the speed change location is a curve in the road, and the effect zone is for the curve in the road.

14. The system of claim 9, wherein the one or more computing devices are further configured to determine that the detected speed limit sign is a temporary speed limit sign or a permanent speed limit sign based on a location of the detected speed limit sign relative to the road.

15. The system of claim 9, wherein the effect zone is defined by a start point and an end point.

16. The system of claim 15, wherein the start point is a point of a road at a predetermined distance before a location of the detected speed limit sign, and the end point is a point of the road at a predetermined distance before a location of another speed limit sign.

17. The system of claim 9, further comprising the vehicle.

18. A non-transitory, tangible computer-readable storage medium on which computer readable instructions of a program are stored, the instructions, when executed by one or more computing devices, cause the one or more computing devices to perform a method, the method comprising:
identifying a speed limit sign in a vehicle's environment along a road;
determining an effect zone of the identified speed limit sign relative to the road based on characteristics of surrounding areas or another detected object along the road; and
controlling the vehicle based on the determined effect zone of the identified speed limit sign.

19. The medium of claim 18, wherein determining the effect zone of the identified speed limit sign relative to the road includes determining whether the identified speed limit sign corresponds to a speed limit sign that is pre-stored in map information.

20. The medium of claim 18, wherein determining the effect zone of the identified speed limit sign relative to the road includes determining the effect zone is for a speed change location when the identified speed limit sign is within a set distance of an area that has characteristics associated with the speed change location or an object associated with the speed change location.

\* \* \* \* \*